(12) United States Patent
Mistler

(10) Patent No.: US 11,338,841 B2
(45) Date of Patent: May 24, 2022

(54) STEER-BY-WIRE STEERING SYSTEM

(71) Applicant: TRW Automotive GmbH, Alfdorf (DE)

(72) Inventor: Maurice Mistler, Cologne (DE)

(73) Assignee: ZF Automotive Germany GmbH, Alfdorf (DE)

( * ) Notice: Subject to any disclaimer, the term of this patent is extended or adjusted under 35 U.S.C. 154(b) by 246 days.

(21) Appl. No.: 16/708,776

(22) Filed: Dec. 10, 2019

(65) Prior Publication Data

US 2020/0189644 A1   Jun. 18, 2020

(30) Foreign Application Priority Data

Dec. 13, 2018 (DE) .......................... 102018132172.4

(51) Int. Cl.
  *B62D 1/18* (2006.01)
  *B62D 5/00* (2006.01)

(52) U.S. Cl.
  CPC ............... *B62D 5/001* (2013.01); *B62D 1/18* (2013.01)

(58) Field of Classification Search
  CPC ................................. B62D 5/001; B62D 5/006
  See application file for complete search history.

(56) References Cited

U.S. PATENT DOCUMENTS

| | | | | |
|---|---|---|---|---|
| 5,201,380 A * | 4/1993 | Callahan | ................ | B62D 5/001 180/403 |
| 10,780,915 B2 * | 9/2020 | Rakouth | ............... | B62D 15/025 |
| 2006/0162989 A1 * | 7/2006 | Yamada | ................ | F16C 29/123 180/444 |
| 2008/0190687 A1 * | 8/2008 | Shirakawa | ............. | B62D 6/002 180/444 |
| 2009/0101429 A1 * | 4/2009 | Williams | ............... | B62D 5/001 180/402 |
| 2010/0132499 A1 * | 6/2010 | Nakatani | .................. | B62D 1/16 74/493 |
| 2010/0147618 A1 * | 6/2010 | Osonoi | .................. | B62D 5/003 180/403 |
| 2017/0167597 A1 * | 6/2017 | Ishige | .................... | B62D 5/001 |
| 2018/0072341 A1 * | 3/2018 | Schulz | ...................... | F16D 3/10 |

(Continued)

FOREIGN PATENT DOCUMENTS

| | | | | |
|---|---|---|---|---|
| DE | | 10015922 A1 * | 10/2001 | ............. B62D 5/001 |
| DE | | 102013014133 B3 * | 10/2014 | ............. B62D 5/001 |

(Continued)

*Primary Examiner* — Nicole T Verley
(74) *Attorney, Agent, or Firm* — Robert James Harwood

(57) ABSTRACT

A steer-by-wire steering system for a motor vehicle is proposed, having a steering means which is attached to a steering column, the length and/or inclination of which can be adjusted, and having a steering means actuator which is configured to load the steering means with a torque. The steering means actuator is arranged non-displaceably and fixedly on the vehicle. The steering means actuator is assigned a first shaft, and the steering column is assigned a second shaft, the first and the second shaft having a variable axial offset and/or a variable angular offset at least over a part range of a length and/or inclination adjustment of the steering column. The first and second shafts are connected in a torque-transmitting manner via a compensation device which can compensate for a change in the axial offset and/or the angular offset.

20 Claims, 1 Drawing Sheet

(56) References Cited

U.S. PATENT DOCUMENTS

| | | | |
|---|---|---|---|
| 2018/0215406 A1* | 8/2018 | Tajima | ................ B62D 1/02 |
| 2018/0297636 A1 | 10/2018 | Lee et al. | |
| 2020/0023885 A1* | 1/2020 | Choi | ................ B62D 5/043 |

FOREIGN PATENT DOCUMENTS

| | | | | |
|---|---|---|---|---|
| DE | 102018102216 A1 * | 8/2019 | ............ | H02K 1/00 |
| DE | 102018214128 A1 * | 2/2020 | .......... | B62D 5/0424 |
| DE | 102018130101 A1 * | 4/2020 | .......... | B62D 5/006 |
| EP | 1053927 A1 * | 11/2000 | .......... | B62D 5/006 |
| EP | 1731403 A2 * | 12/2006 | .......... | B62D 1/163 |
| EP | 3192718 A1 * | 7/2017 | .......... | B62D 5/005 |
| EP | 3225508 A1 * | 10/2017 | .......... | B62D 5/0439 |
| EP | 3225509 A1 * | 10/2017 | ............ | F16H 7/02 |
| EP | 3241719 A2 * | 11/2017 | .......... | B62D 5/001 |
| FR | 2933363 A1 * | 1/2010 | ............ | B62D 1/16 |
| FR | 3099455 A1 * | 2/2021 | .......... | B62D 5/001 |
| JP | 2002154447 A * | 5/2002 | | |
| JP | 2005090601 A * | 4/2005 | | |
| JP | 2007283926 A * | 11/2007 | | |
| JP | 2011116214 A * | 6/2011 | .......... | B62D 5/001 |
| WO | WO-2007069659 A1 * | 6/2007 | .......... | B62D 1/185 |

* cited by examiner

STEER-BY-WIRE STEERING SYSTEM

CROSS-REFERENCE TO RELATED APPLICATION

This application claims priority to German Patent Application No. DE102018132172.4, filed Dec. 13, 2018, the disclosure of which is incorporated herein by reference in its entirety.

TECHNICAL FIELD

The invention relates to a steer-by-wire steering system for a motor vehicle.

BACKGROUND

In the case of steer-by-wire steering systems, there is no direct mechanical operative connection between a steering wheel and the wheels of the motor vehicle. Rather, the steering wheel is assigned a steering angle sensor which detects a steering angle and transmits it to an auxiliary motor. The auxiliary motor then loads a rack of the steer-by-wire steering system with a force, in order to steer the motor vehicle.

On account of the absence of the mechanical operative connection between the steering wheel and the wheels, there is also an absence of feedback from the road to the steering wheel, however. In order to give the driver haptic feedback about the current driving situation and/or the condition of the road, said feedback has to be generated artificially.

For this purpose, a steering wheel actuator is typically provided in steer-by-wire steering systems, which steering wheel actuator is configured to load the steering wheel with a torque. Steering wheel actuators of this type are often also called a "force feedback actuator" (FFA).

In the case of steer-by-wire steering systems which are known from the prior art, the steering wheel actuator also has to be moved in the case of an inclination and/or length adjustment of the steering wheel. This leads firstly to installation space problems, since there has to be sufficient space for a movement of the steering wheel actuator. Secondly, disruptive noise can occur, since the heavy steering wheel actuator is fastened directly to the steering column and therefore lowers the resonant frequency of the steering column. The occurrence of disruptive noise of this type is generally known as "noise vibration harshness" (NVH).

SUMMARY

It is therefore an object of the invention to provide a steer-by-wire steering system, in the case of which the disadvantages from the prior art are eliminated.

According to the invention, the object is achieved by way of a steer-by-wire steering system for a motor vehicle, having a steering means which is attached to a steering column, the length and/or inclination of which can be adjusted, and having a steering means actuator which is configured to load the steering means with a torque, the steering means actuator being arranged non-displaceably and fixedly on the vehicle. Here, the steering means actuator is assigned a first shaft, and the steering column is assigned a second shaft, the first and the second shaft having a variable axial offset and/or a variable angular offset at least over a part range of a length and/or inclination adjustment of the steering column. The first and the second shaft are connected in a torque-transmitting manner via a compensation device, the compensation device being configured to compensate for a change in the axial offset and/or the angular offset in the case of a length and/or inclination adjustment of the steering column.

According to the invention, the steering means actuator is therefore attached fixedly to the motor vehicle and is not also displaced in the case of an adjustment of the steering column. Therefore, however, an angle between the first and the second shaft and/or a spacing between the first and the second shaft change/changes in the case of a length and/or inclination adjustment of the steering column. According to the invention, said angle and/or spacing change is compensated for by way of the compensation device.

As a result, the installation problems are solved which would occur in the case of the movement of the steering means actuator, since the steering means actuator does not also have to be moved in the case of an adjustment of the steering column. Furthermore, as a result, disruptive noise is eliminated which occurs, in particular, in the case of the adjustment of the steering column, since the steering means actuator is attached fixedly to the motor vehicle and is no longer attached directly to the steering column. In particular, the steering means is a steering wheel of the motor vehicle.

The compensation device preferably comprises an articulated shaft. The first and the second shaft are then therefore connected to one another in a torque-transmitting manner via the articulated shaft, the articulated shaft compensating for a change in the axial offset and/or the angular offset between the two shafts. Here, the articulated shaft comprises at least one joint which is assigned to the first or the second shaft. Further preferably, the articulated shaft is configured as a double articulated shaft. The articulated shaft therefore comprises two joints, the first and the second shaft being assigned in each case one joint. In particular, the articulated shaft is configured as a cardan shaft.

In accordance with one aspect of the invention, the compensation device comprises an axial compensation element which is assigned to the first shaft, the second shaft and/or the articulated shaft. The axial compensation element is configured to change an axial length of the first shaft, the second shaft and/or the articulated shaft. As a result, the compensation device can compensate in an optimum way both for a change in the axial offset and for a change in the angular offset of the first and the second shaft.

A further aspect of the invention provides that the axial compensation element has a spline shaft connection. The spline shaft connection can be formed, for example, by way of a spline shaft and a hub which is in engagement with the latter. In a further example, the spline shaft connection is formed by way of a spline shaft and a hollow shaft which is in engagement with the latter. Here, in particular, an inner profile of the hollow shaft is substantially complementary with respect to the profile of the spline shaft.

The articulated shaft preferably has a connecting rod with a variable length, the connecting rod being formed, in particular, by way of a spline shaft and a hollow shaft which is in engagement with the latter. Here, the inner profile of the hollow shaft can be substantially complementary with respect to the profile of the spline shaft. In said refinement of the invention, the axial compensation element is therefore formed by way of the connecting rod with a variable length.

As an alternative or in addition, the compensation device can comprise an offset compensation coupling. The offset compensation coupling is configured to compensate for a change in the axial offset and/or the angular offset in the case of a length and/or inclination adjustment of the steering column. Said refinement of the invention is advantageous, in particular, when merely small changes in the axial offset and/or the angular offset have to be compensated for.

One aspect of the invention provides that the steering means actuator is attached fixedly and non-displaceably to a dashboard support of the motor vehicle. The fastening to the dashboard support guarantees a stable attachment of the steering means actuator to the body of the motor vehicle.

In particular, the steering means can be stowed in a dashboard of the motor vehicle by way of length and/or inclination adjustment of the steering column. Here, "can be stowed" is to be understood to mean that the steering means is lowered into a corresponding receptacle in the dashboard of the motor vehicle, or that the steering means is moved at least very close to the dashboard of the motor vehicle. The compensation device is therefore configured to compensate for even a large change in the axial offset and/or the angular offset of the two shafts, which change occurs in the case of the stowage of the steering means in the dashboard.

The steering means therefore has a retracted position, into which it is moved, for example, in an at least partially automated driving mode of the motor vehicle. The at least partially automated driving mode is, for example, a driving mode, in which at least one transverse movement of the motor vehicle is controlled in an automated manner by a control unit of the motor vehicle.

Furthermore, the object is achieved according to the invention by way of a motor vehicle having an above-described steer-by-wire steering system. Reference is made to the above comments with regard to the advantages.

BRIEF DESCRIPTION OF THE DRAWINGS

Further advantages and properties of the invention result from the following description and the appended drawings; to which reference is made and in which.

DETAILED DESCRIPTION

Figure 1:
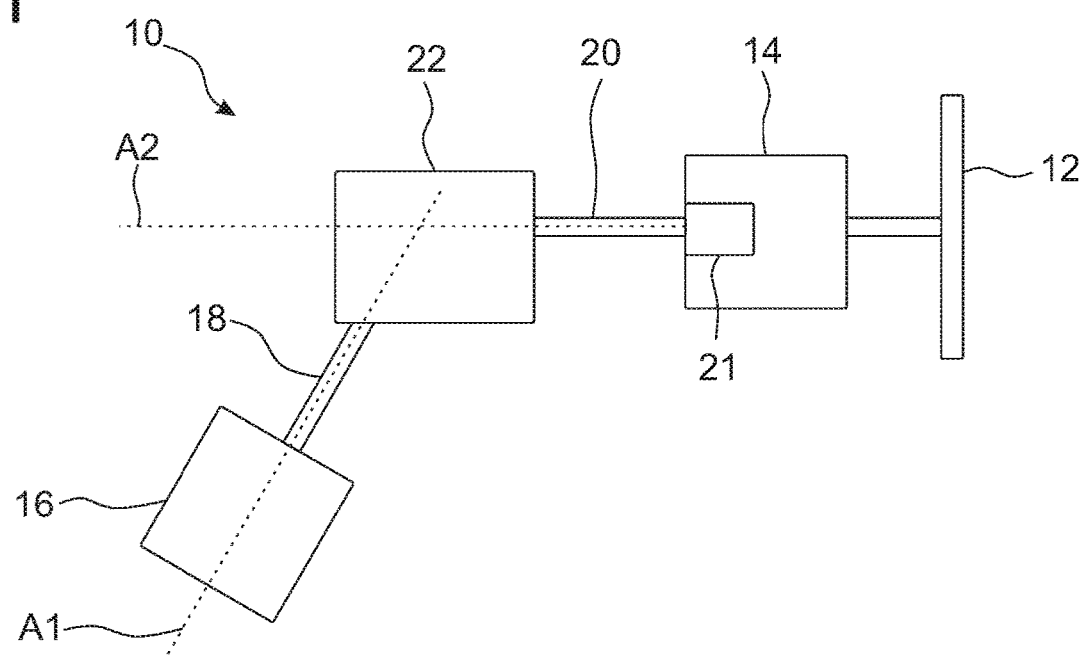
FIG. 1 diagrammatically shows a steer-by-wire steering system according to the invention.

FIG. 1 diagrammatically shows a steer-by-wire steering system 10 of a motor vehicle, which steering system 10 comprises a steering means 12 which is configured as a steering wheel, a steering column 14, the length and/or inclination of which can be adjusted, and a steering means actuator 16. The steering means actuator 16 and the steering column 14 are assigned a first shaft 18 and a second shaft 20, respectively. If a driver loads the steering means 12 with a torque, said torque is transmitted via the steering column 14 to the second shaft 20, as a result of which the second shaft 20 is rotated.

Since no direct mechanical operative connection between the steering means 12 and wheels of the motor vehicle is provided in the case of the steer-by-wire steering system 10, the steering column 14 comprises a steering angle sensor 21 which detects a rotary angle of the steering means 12 and transmits it to an electric motor of the steer-by-wire steering system 10. The electric motor then loads, for example, a rack of the steer-by-wire steering system 10, which rack is connected in a force-transmitting manner at least to the front two wheels of the motor vehicle, with a force, in order to steer the motor vehicle.

The steering means actuator 16 is attached to the motor vehicle non-displaceably and fixedly on the vehicle, preferably to a dashboard support of the motor vehicle. Furthermore, the steering means actuator 16 is configured to load the first shaft 18 with a torque. The first shaft 18 and the second shaft 20 are connected in a torque-transmitting manner via a compensation device 22, as a result of which the steering means actuator 16 can load the steering means 12 with a torque. The steering means actuator 16 is also called a "force feedback actuator" and generates haptic feedback on the steering means 12 for the driver, for example about the current driving situation, restoring forces from the road to the wheels and/or the condition of the road.

As can be seen clearly in FIG. 1, the first shaft 18 and the second shaft 20 have an angular offset in relation to their axial directions A1 and A2, respectively, that is to say that the axial directions A1 and A2 are not parallel, but rather intersect at an angle which is different than 180°. As an alternative or in addition, the two shafts 18, 20 can also have an axial offset, that is to say it is possible that they are not arranged in a common plane. In the case of a length and/or inclination adjustment of the steering column 14, the axial offset and/or the angular offset between the first shaft 18 and the second shaft 20 also change/changes.

In particular, the steering means 12 can be stowed in a dashboard of the motor vehicle by way of a length and/or inclination adjustment of the steering column 14. Here, "can be stowed" is to be understood to mean that the steering means 12 is lowered into a corresponding receptacle in the dashboard of the motor vehicle, or that the steering means 12 is moved at least very close to the dashboard of the motor vehicle.

The compensation device 22 is configured to compensate for said change in the axial offset and/or the angular offset in the case of the length and/or inclination adjustment of the steering column 14. In particular, the compensation device 22 is configured to compensate for even great changes in the axial offset and/or the angular offset, as occur, for example, when the steering means 12 is stowed in the dashboard.

Figure 2:
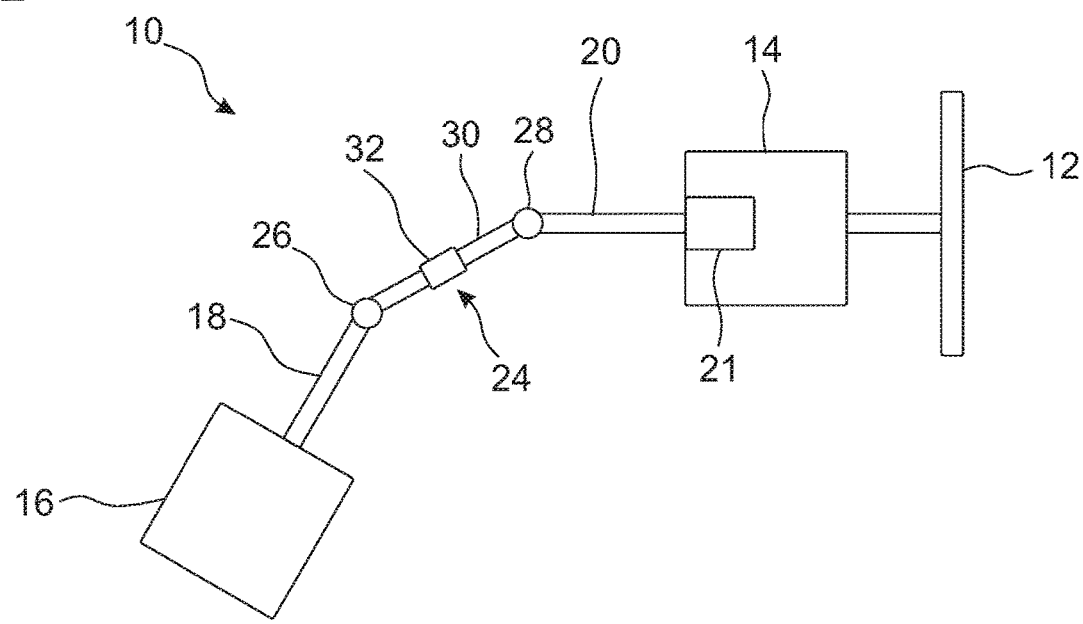
FIG. 2 shows one exemplary embodiment of the steer-by-wire steering system from FIG. 1.

FIG. 2 shows the steer-by-wire steering system 10 with a compensation device 22 in accordance with one exemplary embodiment. Here, the compensation device 22 comprises an articulated shaft 24 which is configured as a double articulated shaft. The articulated shaft 24 comprises a first joint 26 which is assigned to the first shaft 18, and a second joint 28 which is assigned to the second shaft 20. A connecting rod 30 with a variable length extends between the first joint 26 and the second joint 28. For this purpose, the connecting rod 30 has an axial compensation element 32 which is configured to change the length of the connecting rod.

In particular, the axial compensation element 32 comprises a spline shaft connection which is formed by way of a spline shaft and a hollow shaft which is in engagement with the latter. In other words, the connecting rod 30 is formed by way of the spline shaft and the hollow shaft which is in engagement with the latter. Here, in particular, an inner profile of the hollow shaft is substantially complementary with respect to the profile of the spline shaft.

In the case of a length and/or inclination adjustment of the steering column 14, the articulated shaft 24 with the adjustable-length connecting rod 30 compensates both for a change in the angular offset between the first shaft 18 and the second shaft 20 and for a change in the axial offset between the first shaft 18 and the second shaft 20, since, even in the case of a change of the axial offset and/or the angular offset, a torque continues to be transmitted from the steering means actuator 16 via the first shaft 18, the articulated shaft 24 and the second shaft 20 to the steering column 14 and therefore to the steering means 12. As an alternative or in addition to the articulated shaft 24, the compensation device 22 can comprise an offset compensation coupling. Here, the offset compensation coupling is configured to compensate for a change in the angular offset and/or a change in the axial offset between the first shaft 18 and the second shaft 20. An offset compensation coupling is particularly advantageous when merely small changes in the axial offset and/or the angular offset have to be compensated for.

What is claimed is:

1. A steer-by-wire steering system for a motor vehicle comprising:
    a steering means which is attached to a steering column;
    a steering means actuator arranged non-displaceably and fixedly on the vehicle and the steering means actuator being assigned a first shaft, and the steering column being assigned a second shaft, the steering means actuator being configured to apply a torque to the steering means through at least the first and second shafts;
    wherein the first and the second shaft have a variable axial offset and/or a variable angular offset at least over a part range of a length and/or inclination adjustment of the steering column and the first and the second shaft being connected in a torque-transmitting manner via a compensation device; and
    wherein the compensation device is configured to compensate for a change in the axial offset and/or the angular offset in the case of a length and/or inclination adjustment of the steering column.

2. The steer-by-wire steering system as defined in claim 1, wherein the compensation device includes an articulated shaft.

3. The steer-by-wire steering system as defined in claim 2, wherein the articulated shaft is configured as a double articulated shaft.

4. The steer-by-wire steering system as defined in claim 2, wherein the compensation device comprises an axial compensation element which is assigned to the first shaft, the second shaft and/or the articulated shaft.

5. The steer-by-wire steering system as defined in claim 4, wherein the axial compensation element has a spline shaft connection.

6. The steer-by-wire steering system as defined in claim 4, wherein the articulated shaft has a connecting rod with a variable length.

7. The steer-by-wire steering system as defined in claim 1, wherein the compensation device comprises an offset compensation coupling.

8. The steer-by-wire steering system as defined in claim 6, wherein the connecting rod includes a spline shaft and a hollow shaft engaged with one another.

9. The steer-by-wire steering system as defined in claim 1, wherein the steering means is free of a mechanical operative connection with wheels of the motor vehicle.

10. A steer-by-wire steering system for a motor vehicle comprising:
    a steering means connected to a steering column;
    a steering means actuator fixed to the vehicle such that the steering means actuator is prevented from moving relative to the vehicle;
    a first shaft connected to the steering means actuator, the steering means actuator applying a torque to the steering means through at least the first shaft;
    a second shaft directly connected to the steering means;
    a compensation device connecting the first and second shafts together and transmitting torque between the first and second shafts, the compensation device being configured to compensate for a change in at least one of an axial offset and an angular offset between the first and second shafts.

11. The steer-by-wire steering system as defined in claim 10, wherein the compensation device includes an articulated shaft.

12. The steer-by-wire steering system as defined in claim 11, wherein the articulated shaft is configured as a double articulated shaft.

13. The steer-by-wire steering system as defined in claim 11, wherein the articulated shaft has a connecting rod with a variable length.

14. The steer-by-wire steering system as defined in claim 10, wherein the steering means is free of a mechanical operative connection with wheels of the motor vehicle.

15. A steer-by-wire steering system for a motor vehicle comprising:
    a steering means connected to a steering column;
    a steering means actuator operatively connected to the steering means and configured to apply a torque to the steering means, the steering means actuator being fixed to the vehicle such that the steering means actuator is prevented from moving relative to the vehicle;
    a first shaft having a first end connected to the steering means actuator;
    a second shaft having a first end connected to the steering means;
    a compensation device connected to second ends of the first and second shafts and connecting the first and second shafts together and transmitting torque between the first and second shafts, the compensation device being configured to compensate for a change in at least one of an axial offset and an angular offset between the first and second shafts.

16. The steer-by-wire steering system as defined in claim 15, wherein the compensation device includes an articulated shaft.

17. The steer-by-wire steering system as defined in claim 16, wherein the articulated shaft is configured as a double articulated shaft.

18. The steer-by-wire steering system as defined in claim 16, wherein the articulated shaft has a connecting rod with a variable length.

19. The steer-by-wire steering system as defined in claim 18, wherein the connecting rod includes a spline shaft and a hollow shaft engaged with one another.

20. The steer-by-wire steering system as defined in claim 15, wherein the steering means is free of a mechanical operative connection with wheels of the motor vehicle.

* * * * *